US006263933B1

(12) United States Patent
Baus (10) Patent No.: US 6,263,933 B1
(45) Date of Patent: Jul. 24, 2001

(54) INDUSTRIAL SERVICE AGRICULTURAL TIRE

(75) Inventor: André Emile Joseph Baus, Bettembourg (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/331,908

(22) PCT Filed: Feb. 4, 1997

(86) PCT No.: PCT/US97/01623

§ 371 Date: Jun. 24, 1999

§ 102(e) Date: Jun. 24, 1999

(87) PCT Pub. No.: WO98/33669

PCT Pub. Date: Aug. 6, 1998

(51) Int. Cl.$^7$ .................. B60C 11/11; B60C 101/00; B60C 103/04; B60C 107/02; B60C 121/00

(52) U.S. Cl. .................. 152/209.12; 152/209.13; 152/209.22; 152/209.26; 152/902; 152/903

(58) Field of Search .................. 152/209.12, 209.13, 152/209.22, 903, 902, 209.26; D12/142, 146, 147, 148, 149, 150, 151

(56) References Cited

U.S. PATENT DOCUMENTS

| D. 57,124 | * | 2/1921 | Githens | 152/209.22 |
|---|---|---|---|---|
| D. 155,065 | | 9/1949 | Bete | D90/20 |
| D. 191,652 | * | 10/1961 | Smajd et al. | 152/209.12 |
| D. 250,812 | | 1/1979 | Duncan | D12/146 |
| D. 255,674 | | 7/1980 | Menin | D12/147 |
| D. 256,008 | | 7/1980 | Menin | D12/147 |
| D. 260,872 | | 9/1981 | Wright et al. | D12/146 |
| D. 295,399 | * | 4/1988 | Nishio et al. | D12/147 |
| D. 328,579 | | 8/1992 | Manestar | D12/147 |
| D. 329,217 | * | 9/1992 | Ota et al. | D12/146 |
| D. 333,453 | * | 2/1993 | Cook et al. | D12/147 |
| D. 336,269 | | 6/1993 | Hinrichssen et al. | D12/147 |
| D. 342,706 | | 12/1993 | Wise | D12/147 |
| D. 362,222 | | 9/1995 | Guspodin et al. | D12/147 |

(List continued on next page.)

FOREIGN PATENT DOCUMENTS

| 89320 | * | 9/1983 | (EP) . |
| 0 719 660 | | 7/1996 | (EP) . |
| 8-40020 | * | 2/1996 | (JP) .................. 152/209.12 |

OTHER PUBLICATIONS

Patent Abstracts of Japan, vol. 096, No. 006, Jun. 28, 1996, JP 8–40020.

Primary Examiner—Steven D. Maki
(74) Attorney, Agent, or Firm—David L King (57) ABSTRACT

A pneumatic agricultural tire (20) for an industrial type tractor or like vehicle has a plurality of central lugs (60) and a plurality of shoulder lugs (40, 50). The plurality of central lugs (60) are arranged in a circumferentially continuous row and extend across the equatorial plane (EP). Each central lug (60) is similar in shape and orientation relative to each circumferentially adjacent central lug (60). Each central lug (60) has a leading edge (51) and a trailing edge (52). The leading edges (51) of each lug (60) are located on an opposite of the equatorial plane relative to the trailing edge (52) of the same central lug (60). The plurality of shoulder lugs (40, 50) are divided into first and second rows and project radially outwardly from the inner tread (34) and extend from the lateral tread edges (33A, 33H) toward the equatorial plane of the tire (20). The shoulder lugs (40, 50) have an axially inner end (43, 53) being axially spaced from a leading end (64) and a trailing end (66) of the axially adjacent central lugs (60). The lugs (40, 50) in conjunction with the central lugs (60) have constant radii of curvature $R_1$ and $R_2$ on each tread halt (32A and 32B). The curvatures $R_1$ and $R_2$ provide nondirectional performance capability of the tread (32).

9 Claims, 6 Drawing Sheets

U.S. PATENT DOCUMENTS

| | | | |
|---|---|---|---|
| D. 363,907 | 11/1995 | Bonko | D12/151 |
| D. 367,448 * | 2/1996 | Baus et al. | D12/146 |
| D. 371,097 * | 6/1996 | Fukushima | D12/147 |
| D. 384,622 * | 10/1997 | Scheuren et al. | D12/147 |
| D. 388,032 * | 12/1997 | Bonko | D12/146 |
| 2,288,328 * | 6/1942 | Sexton | 152/209.13 |
| 3,196,920 * | 7/1965 | Fishman | 152/209.13 |
| 3,237,669 * | 3/1966 | Travers | 152/209.13 |
| 4,412,575 * | 11/1983 | Maeda et al. | 152/209.13 |
| 4,446,902 * | 5/1984 | Madec et al. . | |
| 4,649,976 | 3/1987 | Cherveny et al. . | |
| 4,982,775 | 1/1991 | Matsumoto | 152/209 B |
| 5,180,453 | 1/1993 | Fukasawa et al. . | |
| 5,464,050 * | 11/1995 | Bonko . | |

\* cited by examiner

INDUSTRIAL SERVICE AGRICULTURAL TIRE

TECHNICAL FIELD

This invention relates to a pneumatic agricultural tire for an industrial type tractor or like vehicle.

BACKGROUND ACT

Farm tire designs for industrial service are classified as R-4 service. Overall R-4 service is quite severe and typically involves high loads at a large degree of reading. The vehicles to which the tires are mounted typically are exposed to large amounts of debris, hard packed soil conditions and high load service conditions.

Often times the vehicle has a back hoe bucket or a front skid loader attached to the vehicle. The tires must traverse gravel and broken concrete and hard packed dirt normally. Occasionally the work site can get rain soaked requiring good traction in wet soil conditions.

These tires are generally relatively small and typically have a nominal rim diameter of 28" (71 cm) or less. They generally have a nonskid depth at the centerline of the tire at approximately 1" (2.54 cm). A typical tire may be a 400/70R24 tire. This tire when produced in a radial construction will have a carcass with 3 to 4 plies of synthetic cord reinforcement. The cords generally are nylon or polyester. The carcass will further include four belts of high flex polyester, nylon or aramid. Historically, these tires have been all fabric reinforced in order to provide better ride and handling.

There has been a continual tradeoff in attempting to increase the aggressive offroad and tractor performance of these tires while maintaining the treadwear durability and ride requirements. The invention disclosed in this patent application teaches a novel tread that is both comfortable riding, long wearing while also achieving superior offroad traction in both the forward and reverse direction of vehicle travel.

DISCLOSURE OF THE INVENTION

Summary

A radial ply pneumatic tire 20 for industrial service applications is disclosed. The tire has a casing 21, the casing 21 having at least one ply 22 reinforced by rubber coated cords, a pair of annular extending bead cores 24, the at least one ply 22 being wrapped about each bead core 24 and extending therebetween, a belt reinforcing structure 28 reinforced with rubber coated cords, and a tread 32 disposed radially outward of the casing 21. The tread 32 has an inner tread base 34, two lateral edges 33A,33B the distance halfway between the lateral edges 33A,33B define the tread equatorial plane EP and a plurality of lugs 40,50,60 extending radially outwardly from the inner tread base 34.

The tread 32 features three rows of lugs 40,50,60. A first row 40 extends axially inwardly from an opposite or a first shoulder region of the tread 32. A second row 50 extends, axially inwardly from a second shoulder region of the tread 32. A central row 60 is positioned between the first and second rows 40,50. The lugs 40 of the first row are similar in shape but opposite in orientation relative to the lugs 50 of the second row. Each lug 40 of the first row lies within a first tread half 32A. Each lug 50 of the second row lies within a second tread half 32B. The lugs 60 of the central row lie in both the first tread half 32A and second tread half 32B. All lugs 40,50,60 have a leading edge 41,51,61 and a trailing 42,52,62 edge. The leading edge 41 of a lug 40 of the first row and a majority of the leading edge 61 of the central lug 60 are defined by a single constant radius of curvature $R^1$. The trailing edge 52 of a second row lug 50 and a majority of the trailing edge 62 of the central lug 60 are defined by a, single constant radius curvature $R^2$, wherein the origin of the radii of curvature $R^1, R^2$ are circumferentially oppositely located in one tread half 32A or 32B relative to the other tread half.

Preferably the central lug 60 has enlarged lug head portions 64,66 extending from both the leading edge 61 and the trailing edge 62, both enlarged lug head portions 64,66 intersecting the equatorial centerplane EP of the tire 20.

More preferably, the trailing enlarged lug head 66 of a central lug 60 is connected to a leading enlarged lug head 64 of a circumferentially adjacent central lug head 60 by a reduced height tie bar 70. The central lug 60 has a radial height h as measured from the inner tread base 34 and the tie bar 70 connecting the lug heads 64,66 has a radial height $h_{T1}$ of at least 30% h. The lugs 40 of the first row and the axially adjacent central lugs 60 are spaced a distance S less than the minimum width of the lug 40, within the distance S a tie bar 80 extends between the axially adjacent lugs 40 of the first row and the lugs 60 of the central row, the tie bar 80 having a radial height $h_{T2}$ of at least one half the lug height h.

Similarly, the lugs 50 of the second row and the axially adjacent central lugs 60 are spaced a distance S less than the minimum width of the lug 50, within the distance S a tie bar 80 extends between the axially adjacent lugs 50 of the second row and the lugs 60 of the central row, the tie bar 80 having a radial height $h_{T2}$ of less than one half the lug height h.

The radial ply pneumatic tire 20 according to the invention has the net-to-gross ratio as measured around the circumference of the tire less than 50%.

The curvatures $R^1$ and $R^2$ when extended to intersect the equatorial plane EP of the tire 20 have tangent lines 90 at the point of intersection which are inclined at an angle θ, θ being less than 60° relative to the equatorial plane. Preferably θ equals less than 45° relative to the equatorial plane.

The leading and trailing edges 41,42,51,52 of the first and second rows of lugs 40,50 have tangency lines 92 relative to the curvature $R_1$ or $R_2$ at an axially outermost point 45,55 along the respective edge, the tangency being inclined at an angle $\alpha_o$ of about 90° relative to the equatorial plane EP.

DEFINITIONS

"Aspect Ratio" means the ratio of a tire's section height to its section width.

"Axial" and "axially" means the lines or directions that are parallel to the axis of rotation of the tire.

"Bead" or "Bead Core" means generally that part of the tire comprising an annular tensile member, the radially inner beads are associated with holding the tire to the rim being wrapped by ply cords and shaped, with or without other reinforcement elements such as flippers, chippers, apexes or fillers, toe guards and chafers.

"Belt Structure" or "Reinforcing Belts" means at least two annular layers or plies of parallel cords, woven or unwoven, underlying the tread, unanchored to the bead, and having both left and right cord angles in the range from 17° to 27° with respect to the equatorial plane of the tire.

"Bias Ply Tire" means that the reinforcing cords in the carcass ply extend diagonally across the tire from bead-tobead at about a 25–65° angle with respect to the equatorial plane of the tire, the ply cords running at opposite angles in alternate layers.

"Carcass" means a laminate of tire ply material and other tire components cut to length suitable for splicing, or already spliced, into a cylindrical or toroidal shape. Additional components may be added to the carcass prior to its being vulcanized to create the molded tire.

"Circumferential" means lines or directions extending along the perimeter of the surface of the annular tread perpendicular to the axial direction.

"Design Rim" means a rim having a specified configuration and width. For the proposes of this specification, the design rim and design rim width are as specified by the industry standards in effect in the location in which the tire is made. For example, in the United States, the design rims are as specified by the Tire and Rim Association. In Europe, the rims are as specified in the European Tyre and Rim Technical Organization—Standards Manual and the term design rim means the same as the standard measurement rims. In Japan, the standard organization is The Japan Automobile Tire Manufacturer's Association.

"Design Rim Width" is the specific commercially available rim width assigned to each tire size and typically is between 75% and 90% of the specific tire's section width.

"Equatorial Plane (EP)" means the plane perpendicular to the tire's axis of rotation and passing through the center of its tread.

"Footprint" means the contact patch or area of contact of the tire tread with a flat surface at zero speed and under normal load and pressure.

"Inner" means toward the inside of the tire and "outer" means toward its exterior.

"Lateral Edge" means the axially outermost edge of the tread as defined by a plane parallel to the equatorial plane and intersecting the outer ends of the axially outermost traction lugs at the radial height of the inner tread surface.

"Leading" refers to a portion or part of the tread that contacts the ground first, with respect to a series of such parts or portions, during rotation of the tire in the direction of travel.

"Net-to-gross Ratio" means the ratio of the surface are of the normally loaded and normally inflated tire tread rubber that makes contact with a hard flat surface, divided by the total area of the tread, including noncontacting portions such as grooves as measured around the entire circumference of the tire.

"Normal Inflation Pressure" means the specific design inflation pressure and load assigned by the appropriate standards organization for the service condition for the tire.

"Normal Load" means the specific design inflation pressure and load assigned by the appropriate standards organization for the service condition for the tire. "Radial" and "radially" mean directions radially toward or away from the axis of rotation of the tire.

"Radial Ply Tire" means a belted or circumferentially-restricted pneumatic tire in which the ply cords which extend from bead to bead are laid at cord angles between 65% and 90% with respect to the equatorial plane of the tire.

"Section Height" (SH) means the radial distance from the nominal rim diameter to the outer diameter of the tire at its equatorial plane.

"Section Width" (SW) means the maximum linear distance parallel to the axis of the tire and between the exterior of its sidewalls when and after it has been inflated at normal pressure for 24 hours, but unloaded, excluding elevations of the sidewalls due to labeling, decoration or protective bands.

"Tire Design Load" is the base or reference load assigned to a tire at a specific inflation pressure and service condition; other load-pressure relationships applicable to the tire are based upon that base or reference.

"Trailing" refers to a portion or part of the tread that contacts the ground last, with respect to a series of such parts or portions during rotation of the tire in the direction of travel.

"Tread Arc Width" (TAW) means the width of an arc having its center located on the plane (EP) and which substantially coincides with the radially outermost surfaces of the various traction elements (lugs, blocks, buttons, ribs, etc.) across the lateral or axial width of the tread portions of a tire when the tire is mounted upon its designated rim and inflated to its specified inflation pressure but not subject to any load.

"Tread Width" means the arc length of the tread surface in the axial direction, that is, in a plane parallel to the axis of rotation of the tire.

"Unit Tread Pressure" means the radial load borne per unit area (square centimeter or square inch) of the tread surface when that area is in the footprint of the normally inflated and normally loaded tire.

BRIEF DESCRIPTION OF DRAWINGS

The following is a brief description of the drawings in which like parts bear like reference numerals and in which.

DETAILED DESCRIPTION OF THE INVENTION

Figure 4:
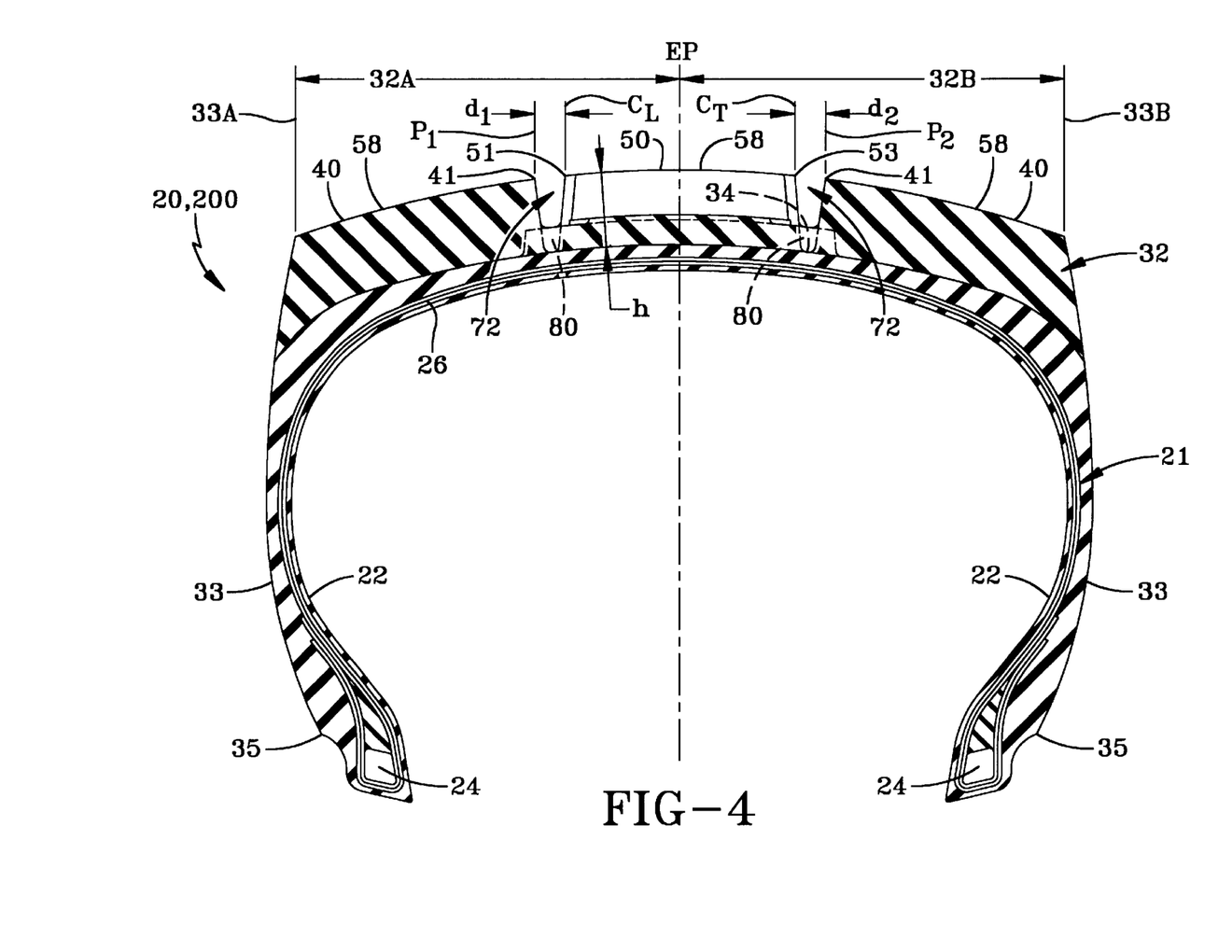
FIG. 4 is a cross-sectional view of the tire taken along lines 4—4 of FIG. 2.

Now referring to FIG. 4 a tire is shown in cross-sectional view generally as reference numeral 20. The tire has a casing 21 having one or more carcass plies 22 extending circumferentially about the axis rotation of the tire. As illustrated the tire preferably has 3 to 4 cord reinforced plies having synthetic nylon or polyester cords. The carcass plies are anchored around a pair of substantially inextensible annular beads 24. A belt reinforcing member 26 has one or more belt plies disposed radially outward from the carcass plies. Preferably four belts are employed. The belts being of a polyester, nylon or aramid cord reinforcement alternatively the cords can be of an ultra high tensile monofilament steel cord reinforcement, These belt plies provide reinforcement for the crown region of the tire 20. A circumferentially extending tread 32 is located radially outwardly of the belt reinforcing structure 26.

A sidewall portion 33 extends radially inwardly from each axial or lateral tread edge 33A, 33B of the tread to an annular bead portion 35 having the beads 24 located therein. Carcass plies 22 preferably have the cords oriented radially. The number of plies depends an the load carrying requirements of the tire. The figures illustrate the preferred tread pattern made in a non-directional fashion.

Figure 1:
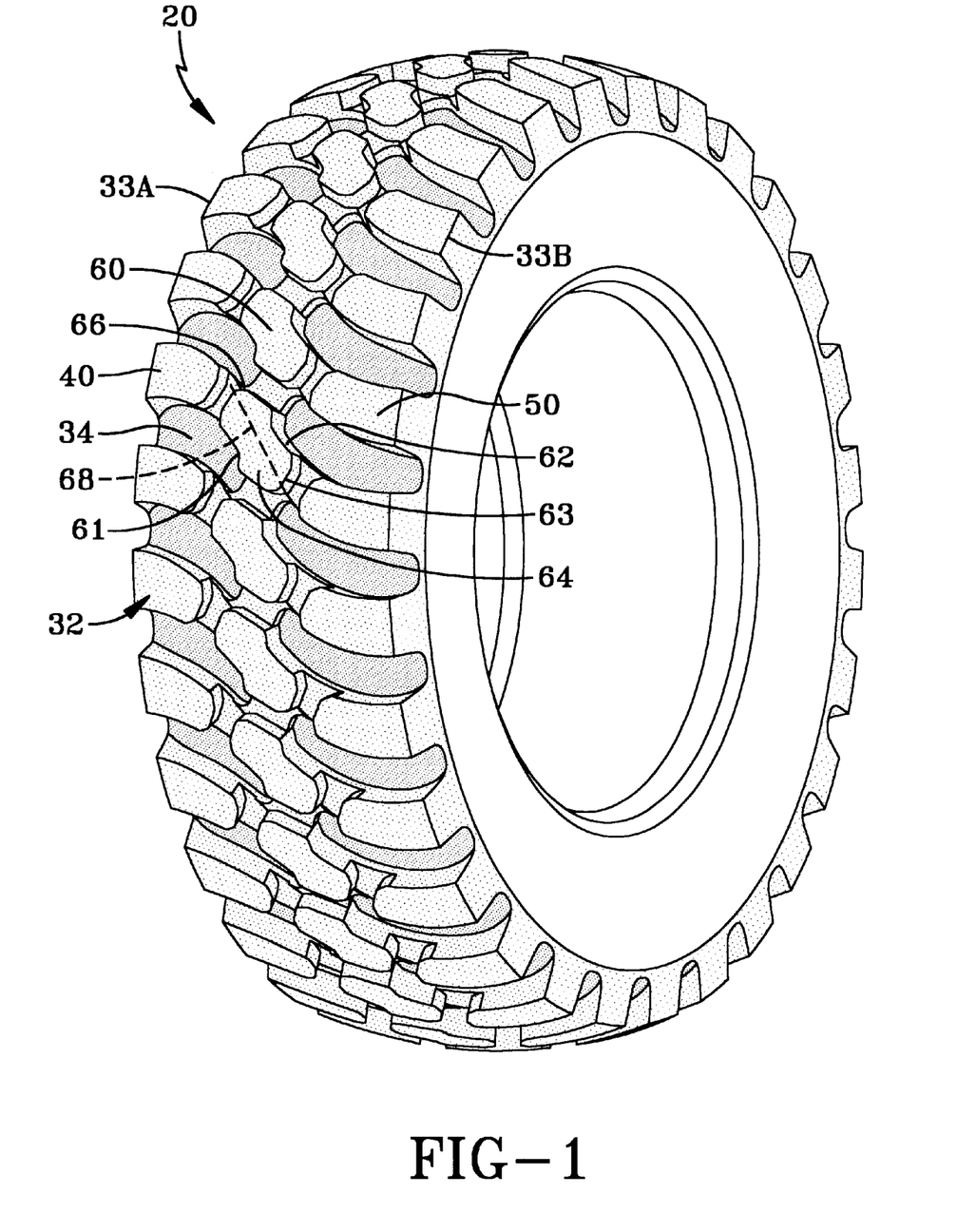
FIG. 1 is a perspective view of a first embodiment tire according to the invention.
Figure 2:
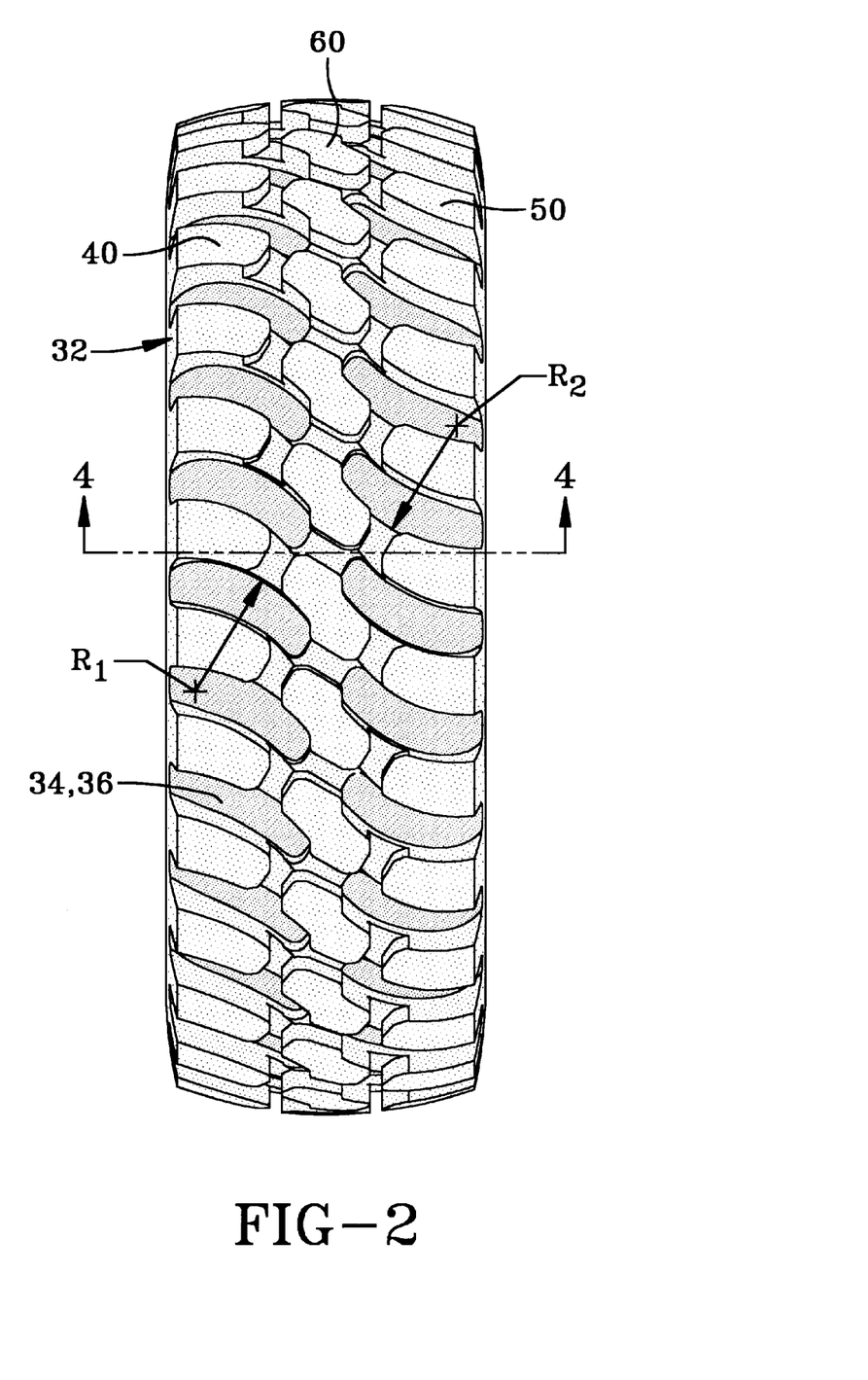
FIG. 2 is a plan view of the tire of FIG. 1.
Figure 3:
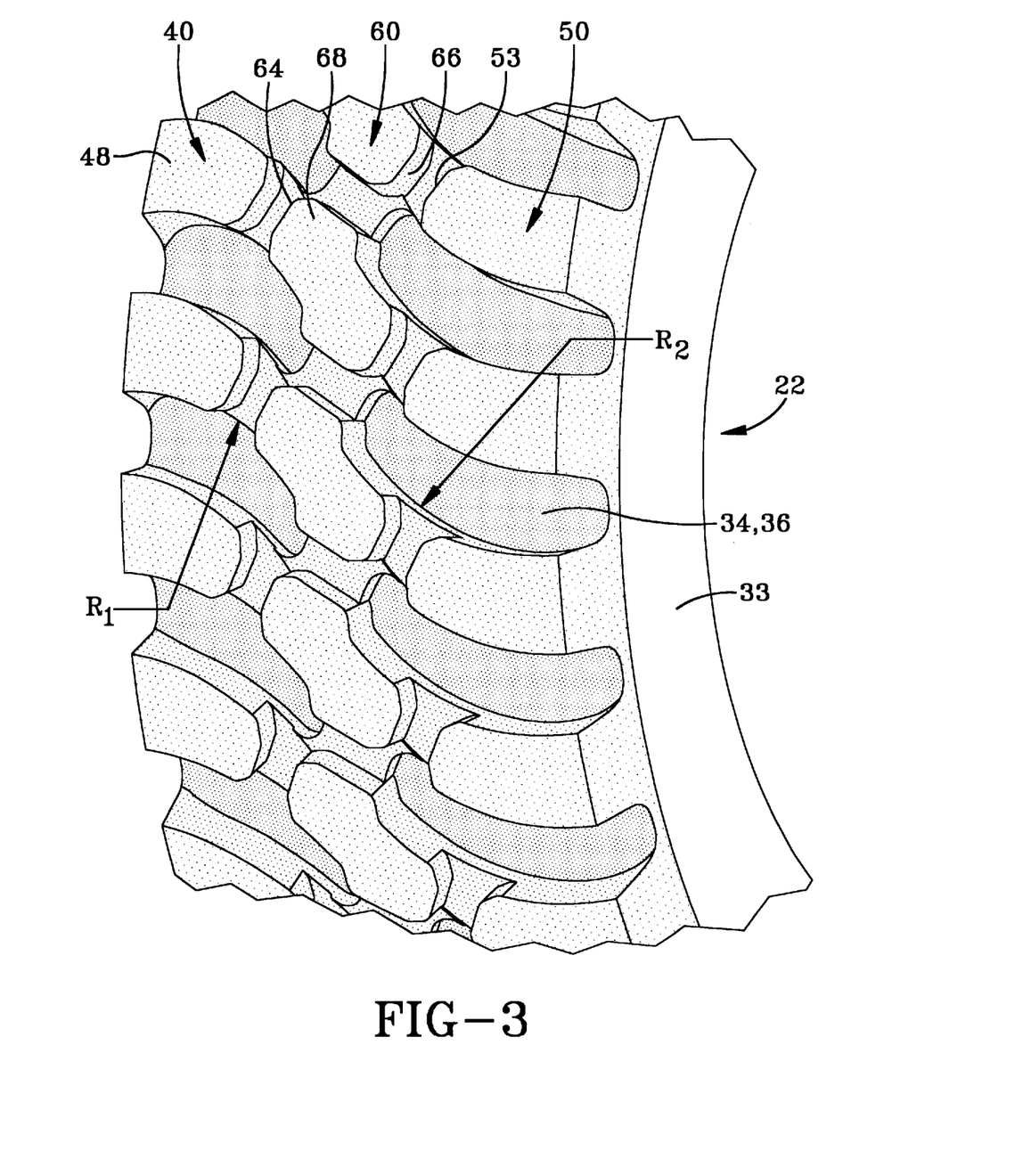
FIG. 3 is an enlarged perspective fragmentary view of a portion of the tread of the tire taken from FIG. 2.

Now referring to FIG. 1, a tire 20 according to the present invention, is illustrated. The tire 20 according to the present invention as a unique non-directional tread 32. The tread 32 has a first tread edge 33A and a second tread else 33B. Disposed between the tread edges 33A and 33B is an inner tread 34 and a plurality of lugs 44,50 and 60 extending radially outwardly from the inner tread 34. As illustrated in FIG. 2 each central lug 60 has a radially outer surface 68, a leading first edge 61, a trailing second edge 62, and a center line 63 between the first and second edges. Each central lug 60 extends generally circumferential from an enlarged leading edge lug head portion 64 to a trailing enlarged lug head portion 66.

Figure 5:
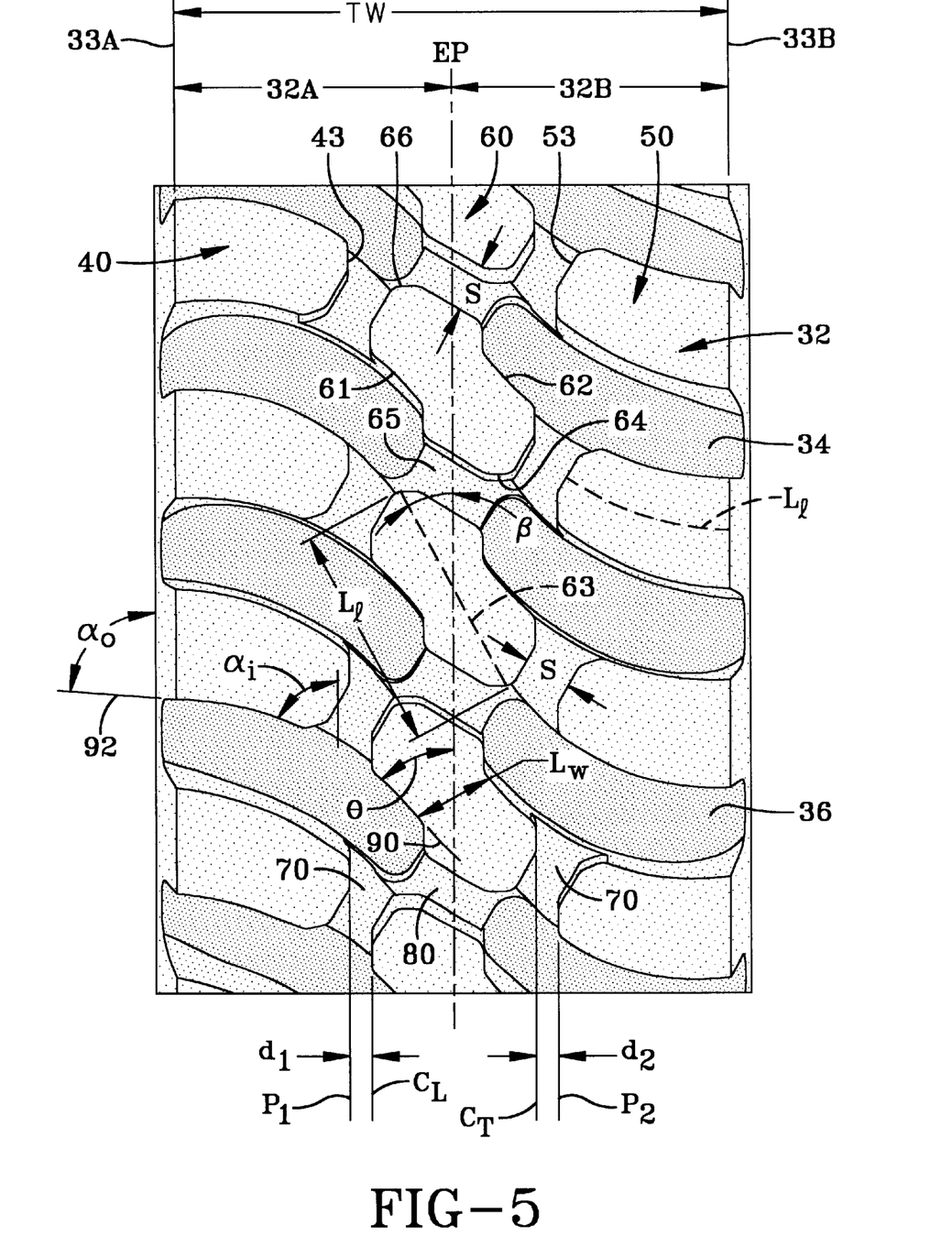
FIGS. 5 and 6 are plan views of a fragmentary portion of the tread of the tire according to the present invention.

As shown in FIG. 5, the average distance along the center line 63 between the leading and trailing ends 61,62 defines the total lug length $L_1$ of the central lug 60. The length $L_1$ is at least 10% of the tread width, preferably about 30%.

The distance extending substantially perpendicularly between the leading and trailing edges 61,62 of the central lug 60 define the average lug width ($l_w$). The radial distance extending between the inner tread 34 and the tread edges 61,62 of the lug 60 defines the radial lug height h. At the equatorial plane of the tire 20 the lug height preferably is an R-4 type lug height as specified by the Tire & Rim Industry standard for industrial service applications.

The central lugs 60 are arranged in a circumferentially repeating row of lugs 60, each lug 60 extends crossing the equatorial plane (EP). The circumferentially adjacent central lugs 60 are similarly oriented. Each lug 60 preferably lies equally within each of the respective tread halves 32A or 32B. The loading edges 61 excluding the leading edge lug head 64 as shown lie entirely within tread half 32A while the trailing edges 62 excluding the trailing edge lug head 66 lie entirely within the tread half 32B. These central lugs 60 have an enlarged lug heads 64,66 at the trailing and leading edges 61,62 of the lug 60. The average width of the lugs 60 is slightly enlarged relative to the average width of the shoulder lugs 40,50. This enlarged central lug 60 is extremely durable and provides excellent traction and ride performance.

Figure 6:
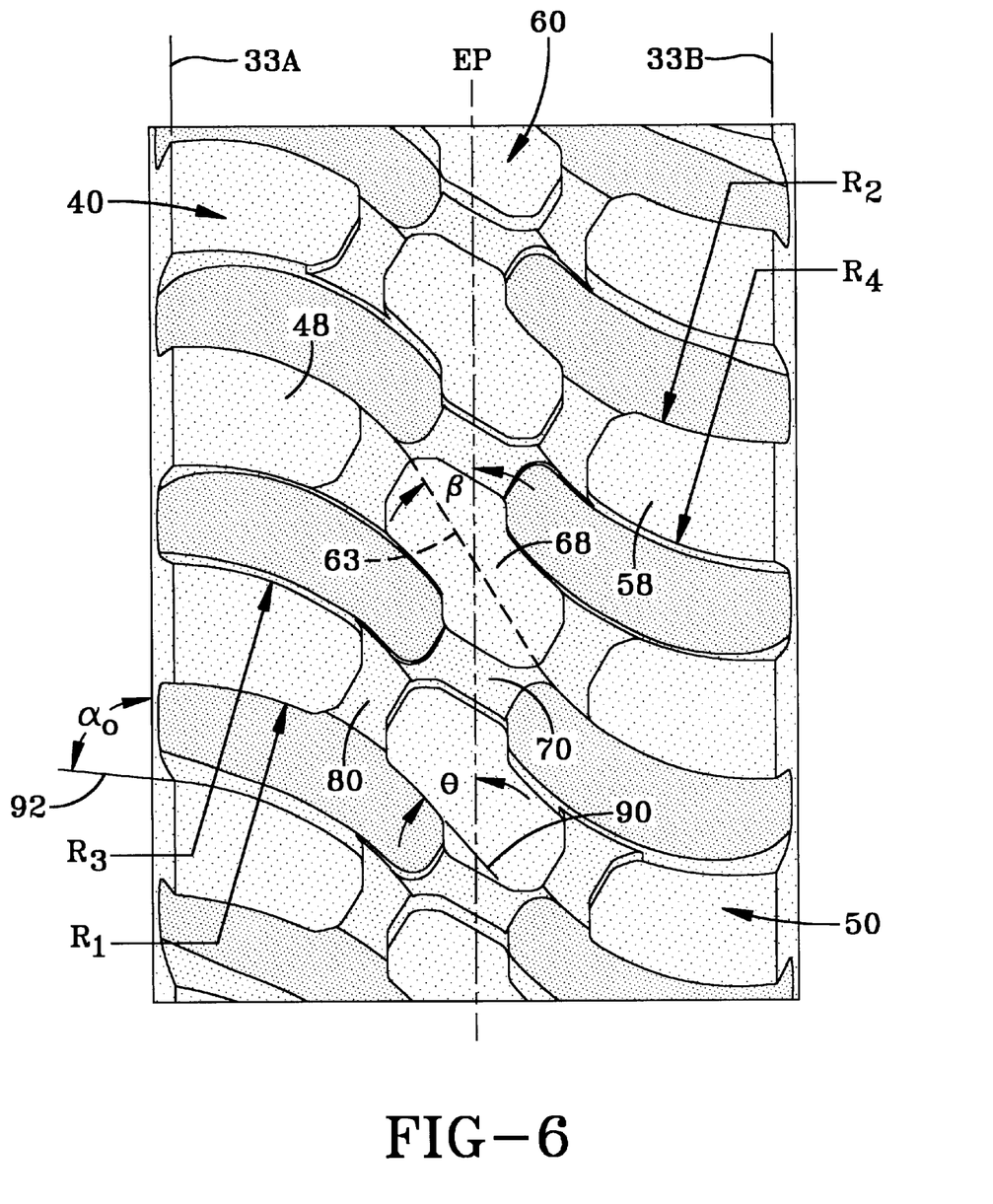

The ride performance and traction capabilities is further enhanced by the employment of a plurality of shoulder lugs 40,50 which extend from each respective tread edge 33A or 33B and lie entirely within their respective tread half 32A or 32B. The shoulder lugs 40 and 50 have a total lug length $L_1$ about equal to the total lug length $L_1$ of the central lug 60, As shown, the shoulder lugs have a lug length $L_1$ of about 10 to 30% of the tread width. The shoulder lugs 40,50 are divided into two rows. The first row of shoulder lugs 40 has an axially inner end 43 that is located substantially circumferentially aligned with the axially inner ends 53 of the second row of lugs 50. The second row of shoulder lugs 50 extend from the tread edge 33B and have a length substantially equal to the length of the first row of shoulder lugs 40. The second row of shoulder lugs 50 have an axially inner end 53 that is circumferentially located generally aligned with the axially inner ends 43 of the first row of lugs 40. As shown in FIG. 6, both the first row and second row of shoulder lugs 40,50 have preferably a uniform curvature. The axially inner inclination $\alpha_i$ being about 45° relative to the equatorial plane of the axially outer inclination $\alpha_o$ is about 90° relative to the equatorial plane. As further shown in FIG. 6, the central lug 60 has a middle portion which has a center line 63 intersecting the leading and trailing ends of the enlarged lug heads 64,66 lying between edges 61,62. The centerline 63 is oriented at an angle β of less than 50°, preferably about than 45° relative to the equatorial plane.

As shown in FIG. 5, the net-to-gross ratio of the tread is less than 50% preferably 45%. The space between the lugs creates large soil discharge channels 36. These channels create a very open tread pattern. The openness of the tread pattern further enhances the self-cleaning properties of the tread 32 keeping it from packing with mud.

With further reference to FIG. 5, the first row and second row of shoulder lugs 40,50 and the central lugs 60 are axially spaced at the outer surface 48,58 and 68 of the less 40,50,60 such that the axially inner ends 43,53 of the first and second rows of shoulder lugs 40,50 are axially aligned within each respective row. The leading ends of lug head 64 and the trailing ends of lug head 66 of the central lugs 60 are also axially aligned with each circumferentially adjacent central lugs respective leading and trailing ends. A plane $P_1$ is tangent to the inner ends 43 of the first row of shoulder lugs 40 and is spaced an axially distance $d_1$ from a plane $C_L$ tangent to the ends of the trailing edge 61 of the central lugs 60. A plane $P_2$ tangent to the axially inner ends 53 of the second row of the shoulder rows 50 is spaced a distance $d_2$ from a plane $C_T$. The plane $C_T$ is tangent to the ends of the trailing edge 62 of the central lugs 60. The distance $d_1$ and $d_2$ form two circumferentially continuous straight channels 72 around the periphery of the tread 32. The agricultural tire preferably has the distances $d_1$ and $d_2$ being equal and the planes $C_T$ and $C_L$ each located an axial distance of 5% of the tread width or more from the equatorial plane (EP) as illustrated. Preferably the plane $C_T$ and $C_L$ are equally spaced from the equatorial plane (EP) a distance of at least 10% of the tread width.

With reference to FIGS. 1–6 a tread 32 of the tire 20 is shown having a non-directional tread pattern. The tread 32 of tire 20 has the first row of shoulder lugs 40 oppositely oriented but similarly inclined relative to the shoulder lugs 50 of the opposite row as can be seen from the perspective view of FIG. 6 and the plan view of FIG. 7, the lugs 40 and 50 extend in a substantially curvilinear fashion across the tread 32. In the tire 20 when the tire is normally, loaded and inflated, the tread 32 exhibits a net-to-gross ratio of less than 50% preferably about 45%. The tire 20 exhibits a nominal rim diameter of 28" (71 cm) or less and a tread lug height h that is measured from the inner tread 34 to the radially outer surface 68 of the lugs 60 at the equatorial plane of an industry standard R-4 lug height. For example, in a 400/70R24 tire, the nonskid depth at the centerline of the tires 20 will be approximately one inch (2.5 cm).

With reference to FIG. 1 as can be seen from the cross-sectional view of the tire, the tire 20 has a constant tread arc at the shoulder, the nonskid depth increases to approximately 125% to 175%, preferably 150%, of the nonskid depth as measured from the equatorial plane (EP) of the tire 20.

Due to the contour of the tread 32 it can easily be appreciated that the center of the tread bears most of the load carrying capacity while the shoulder regions are provided to increase traction and provide additional biting or digging surfaces which provide traction particularly in loose soil or loose debris. It is believed preferable that the tread lugs 40,50 be reasonably braced using generous angles and tie bar bracing 70,80 to further enhance the stiffness of the lugs and to improve its durability.

One novel feature of this non-directional tread pattern of the tire 20 is in FIGS. 1–5 is that the lugs 40 of the first row and the lugs 50 of the second row 46 do not axially overlap at the equatorial plane. This was a common feature employed in industrial service R-4 tires of the prior art.

Secondarily, the central lugs 60 do not overlap or interlock with either the first or the second rows of shoulder lugs 50. Again, this feature is not believed to have been employed in this type of tire heretofore. The benefits of this feature is that the tread pattern remains relatively open increasing the overall tractive performance of the tire while not sacrificing the overall ride performance.

An equally important novel feature of the lugs 40,60 and 50,60 is that a leading edge 51,61 and trailing edges 42,62 of the shoulder lug and central lugs excluding the enlarged lug heads 64,66 are of identical curvatures $R_1$ or $R_2$ respectively as shown. This means that the biting edges of two lugs 40,60 or lugs 50,60 depending on the direction of travel enter the footprint of the tire with a similar single radius of curvature and in combination with an enlarged lug head 64,66 of a central lug 60 create a traction enhancing elongated lug effect. This elongation of similar tractive curvature extends beyond the equatorial plane regardless of the direction of tread. This creates a balance of forward or reverse draw bar traction efficiency which is approximately equal regardless of the rotation direction.

This further enables the tire to be produced in a single mold cutting tooling cost in one half.

As shown the illustrated preferred embodiment tire in a 400/70R24 tire had an $R_1$ of about 200 mm and an $R_2$ equal to $R_1$, preferably the tire shown had an $R_1$, $R_2$ of 205.8, $R_1$ being the radius of curvature of the leading edge 41 of lug 40 and $R_2$ being the radius of curvature of the trailing edge 52 of lug 50. The respective opposite edges 42,52 had radii of curvature less than $R_1$ and $R_2$, those curvatures $R_3$ and $R_4$ respectively were about 180 mm actually 179.1 mm. This combination of curvatures means that the lugs 40,50 are wider at the lateral edges 33A, 33B and progressively narrower toward the ends 43,53 respectively. Similarly, the soil discharge channels 36 widen as they extend axially further enhancing the soil discharge performance of the tire 20.

As further shown, the tie bars 70 in the preferred tire had a radial height equal to 40% $l_h$ and the tie bars 80 had a radial height of 33% to 40% $l_h$. This insured that sufficient openness of the lug pattern presents soil packing. The tie bars yield an open somewhat flexible tread with very durably lugs 40,50,60 due to the interconnection of the lug via the tie bars 70,80.

What is claimed is:

1. A radial ply pneumatic tire for industrial service applications, the tire having a casing, the casing having at least one ply reinforced by rubber coated cords, a pair of annular extending bead cores, the at least one ply being wrapped about each bead core and extending there between, a belt reinforcing structure reinforced with rubber coated cords, and a tread disposed radially outward of the casing, the tread having an inner tread base, two lateral edges, the distance halfway between the lateral edges define the tread equatorial plane (EP) and a plurality of lugs extending radially outwardly from the inner tread base, the plurality of lugs including;

three rows of lugs, including a first row of lugs extending axially inwardly from a first shoulder region of the tread, a second row lugs extending axially inwardly from a second shoulder region of the tread, and a central row of lugs positioned between the first and second rows of lugs, the lugs of the first row of lugs being similar in shape and inclination but opposite in orientation relative to the lugs of the second row of lugs, each lug of the first row of lugs lying within a first tread half, each lug of the second row of lugs lying within a second tread half, the lugs of the central row of lugs lying in both the first tread half and second tread half, the lugs each having a leading edge and a trailing edge, the tread being characterized by:

the distance along a centerline between the leading edge and the trailing edge defines the total length $L_1$, each lug has a total lug length of at least 10% to 30% of the total tread width, the central lug having an enlarged leading edge lug head portion extending from the leading edge and an enlarged trailing edge lug head extending from the trailing edge, the leading edge of a lug of the first row and the leading edge of the central lug excluding the leading edge enlarged lug head portion being defined by a constant radius of curvature $R_1$ and the trailing edge of a second row lug and the trailing edge of the central lug excluding the enlarged trailing edge lug head portion being defined by a constant radius of curvature $R_2$, wherein the origins of the radii of curvature $R_1$, $R_2$ are circumferentially oppositely located in one tread half relative to the other tread half and; the enlarged lug head portions intersect the equatorial plane of the tire such that the central lugs do not overlap or interlock with either the first row of lugs or the second row of lugs.

2. The radial ply pneumatic tire of claim 1 wherein the trailing edge enlarged lug head of a central lug is connected to a leading edge enlarged lug head by a reduced height tie bar.

3. The radial ply pneumatic tire of claim 2 wherein the central lug has a radial height h as measured from the inner tread base and the tie bar connecting the lug heads has a radial height $h_{T1}$ of at least 50% h.

4. The radial ply pneumatic tire of claim 3 wherein the lugs of the first row and the axially adjacent central lugs are spaced a distance s less than the minimum width of the lug of the first row, within the distance s a tie bar extends between the axially adjacent lugs of the first row and the lugs of the central row, the tie bar having a radial height $h_{T2}$ of at least one half the lug height h.

5. The radial ply pneumatic tire of claim 3 wherein the lugs of the second row and the axially adjacent central lugs are spaced a distance s less than the minimum width of the lug of the second row, within the distance s a tie bar extends between the axially adjacent lugs of the second row and the lugs of the central row, the tie bar having a radial height $h_{T2}$ of at least one half the lug height h.

6. The radial ply pneumatic tire of claim 1 wherein the net-to-gross ratio as measured around the circumference of the tire is less than 50%.

7. The radial ply pneumatic tire of claim 1 wherein the curvatures $R_1$ and $R_2$ when extended to intersect the equatorial plane of the tire have tangent lines at the point of intersection inclined at an angle θ, θ being less than 60° relative to the equatorial plane.

8. The radial ply pneumatic tire of claim 7 wherein θ equals less than 45° relative to the equatorial plane.

9. The radial ply pneumatic tire of claim 8 wherein the leading and trailing edges of the first and second rows of lugs have a tangency to the curvature $R_1$ or $R_2$ at an axially outermost point along the respective edge, the tangency being inclined of an angle $α_o$ of about 90° relative to the equatorial plane.

* * * * *